United States Patent
Green et al.

(10) Patent No.: US 10,637,926 B2
(45) Date of Patent: Apr. 28, 2020

(54) METHODS AND APPARATUSES FOR PROVIDING A DATA FEED FOR INTERNET OF THINGS

(71) Applicant: Iotic Labs Limited, Cambridge (GB)

(72) Inventors: Paul Nigel Green, Essex (GB); Mark Nicholas James Wharton, Bury St Edmunds (GB)

(73) Assignee: Iotic Labs Limited, Cambridge (GB)

( * ) Notice: Subject to any disclaimer, the term of this patent is extended or adjusted under 35 U.S.C. 154(b) by 629 days.

(21) Appl. No.: 15/028,416

(22) PCT Filed: Oct. 7, 2014

(86) PCT No.: PCT/GB2014/053026
§ 371 (c)(1),
(2) Date: Apr. 8, 2016

(87) PCT Pub. No.: WO2015/052512
PCT Pub. Date: Apr. 16, 2015

(65) Prior Publication Data
US 2016/0255167 A1    Sep. 1, 2016

Related U.S. Application Data

(60) Provisional application No. 61/888,472, filed on Oct. 8, 2013.

(51) Int. Cl.
*G06F 13/00* (2006.01)
*H04L 29/08* (2006.01)
(Continued)

(52) U.S. Cl.
CPC .......... *H04L 67/12* (2013.01); *H04L 41/0806* (2013.01); *H04L 41/0823* (2013.01);
(Continued)

(58) Field of Classification Search
CPC ..... H04W 4/005; H04W 12/06; H04W 12/10; H04W 4/70; H04W 4/60; H04W 12/12;
(Continued)

(56) References Cited

U.S. PATENT DOCUMENTS 6,233,611 B1 *   5/2001   Ludtke ................ H04L 12/2805
                                                    375/E7.019
6,493,753 B2 * 12/2002   Ludtke ................ H04L 12/2805
                                                    375/E7.019

(Continued)

OTHER PUBLICATIONS

United States Patent and Trademark Office, Final Office Action issued in U.S. Appl. No. 15/028,399, Notification dated Jun. 14, 2019, 9 pgs.

(Continued)

*Primary Examiner* — Kenneth R Coulter
(74) *Attorney, Agent, or Firm* — Greenberg Traurig, LLP

(57) ABSTRACT

Computer apparatus and methods for brokering communications between a plurality of virtual devices, each virtual device being a proxy for one of a real device or a real requestor. The computer apparatus comprises a registrar computer configured to communicate with a plurality of virtual devices and maintain a register of the virtual devices. The computer apparatus also comprises a data feed directory comprising entries indicating data feeds and/or resources available to virtual requestor devices from at least one virtual device registered with the registrar computer. To be accompanied, when published, by FIG. 3 of the accompanying drawings.

10 Claims, 13 Drawing Sheets

(51) Int. Cl.
*H04W 4/70* (2018.01)
*H04W 4/60* (2018.01)
*H04L 29/06* (2006.01)
*H04W 12/06* (2009.01)
*H04W 12/10* (2009.01)
*H04L 12/24* (2006.01)
*H04L 29/12* (2006.01)
*H04W 12/12* (2009.01)

(52) U.S. Cl.
CPC .............. *H04L 61/15* (2013.01); *H04L 63/08* (2013.01); *H04L 63/10* (2013.01); *H04L 63/1433* (2013.01); *H04L 65/1069* (2013.01); *H04L 65/1073* (2013.01); *H04L 65/1083* (2013.01); *H04L 67/02* (2013.01); *H04L 67/10* (2013.01); *H04L 67/28* (2013.01); *H04L 67/2804* (2013.01); *H04L 67/2809* (2013.01); *H04L 67/32* (2013.01); *H04W 4/60* (2018.02); *H04W 4/70* (2018.02); *H04W 12/06* (2013.01); *H04W 12/10* (2013.01); *H04L 63/12* (2013.01); *H04L 63/1458* (2013.01); *H04W 12/12* (2013.01); *Y04S 40/18* (2018.05)

(58) Field of Classification Search
CPC ......... H04L 67/12; H04L 67/02; H04L 63/08; H04L 63/10; H04L 63/1433; H04L 65/1073; H04L 65/1083; H04L 67/2809; H04L 41/0823; H04L 61/15; H04L 65/1069; H04L 67/10; H04L 67/2804; H04L 67/32; H04L 41/0806; H04L 67/28; H04L 63/12; H04L 63/1458; Y04S 40/18
USPC ....... 709/223, 203, 217–219, 231, 232, 227, 709/228, 245, 238, 202
See application file for complete search history.

(56) References Cited

U.S. PATENT DOCUMENTS

| | | | | |
|---|---|---|---|---|
| 6,496,860 | B2 * | 12/2002 | Ludtke | H04L 12/2805 375/E7.019 |
| 6,662,195 | B1 | 12/2003 | Langseth et al. | |
| 8,051,100 | B2 * | 11/2011 | Yahata | G11B 27/105 707/791 |
| 10,075,528 | B2 * | 9/2018 | Green | H04W 4/70 |
| 10,275,173 | B2 * | 4/2019 | Tailliet | G11C 8/12 |
| 10,311,058 | B1 * | 6/2019 | Kumar | G06N 3/08 |
| 10,375,173 | B2 * | 8/2019 | Green | H04L 65/1069 |
| 10,516,735 | B2 * | 12/2019 | Green | H04L 67/28 |
| 10,516,736 | B2 * | 12/2019 | Green | H04L 63/08 |
| 10,536,390 | B1 * | 1/2020 | Green | H04L 67/02 |
| 10,542,094 | B2 * | 1/2020 | Green | H04W 12/06 |
| 2001/0018718 | A1 * | 8/2001 | Ludtke | H04L 12/2805 719/321 |
| 2002/0087746 | A1 * | 7/2002 | Ludtke | H04L 12/2805 710/1 |
| 2006/0242641 | A1 | 10/2006 | Kinsey | |
| 2007/0100959 | A1 | 5/2007 | Eichstaedt et al. | |
| 2008/0021963 | A1 | 1/2008 | Jana et al. | |
| 2009/0045253 | A1 * | 2/2009 | Han | G06F 21/31 235/380 |
| 2009/0228520 | A1 * | 9/2009 | Yahata | G11B 27/105 |
| 2011/0066715 | A1 | 3/2011 | Schieder et al. | |
| 2013/0110943 | A1 * | 5/2013 | Menon | G06Q 10/107 709/206 |
| 2014/0359476 | A1 * | 12/2014 | Wakeford | A63F 13/85 715/748 |
| 2015/0244735 | A1 | 8/2015 | Kumar | |
| 2016/0025066 | A1 | 1/2016 | Koegler | |
| 2016/0255066 | A1 * | 9/2016 | Green | H04W 4/70 726/4 |
| 2016/0255122 | A1 * | 9/2016 | Green | H04W 4/70 709/217 |
| 2016/0255123 | A1 * | 9/2016 | Green | H04W 4/70 709/220 |
| 2016/0255155 | A1 * | 9/2016 | Green | H04W 4/70 709/225 |
| 2016/0261462 | A1 * | 9/2016 | Green | H04W 4/70 |
| 2016/0294950 | A1 * | 10/2016 | Green | H04W 4/70 |

OTHER PUBLICATIONS

United States Patent and Trademark Office, Final Office Action issued in U.S. Appl. No. 15/028,395, Notification dated Apr. 5, 2019, 11 pgs.
United States Patent and Trademark Office, Final Office Action issued in U.S. Appl. No. 15/028,418, Notification dated Mar. 8, 2019, 13 pgs.
United States Patent and Trademark Office, Final Office Action issued in U.S. Appl. No. 15/028,410, Notification dated Mar. 21, 2019, 10 pgs.
International Search Report in related PCT Application No. PCT/GB2014/052489 dated Nov. 14, 2014.
Written Opinion in related PCT Application No. PCT/GB2014/052489 dated Nov. 14, 2014.
International Search Report in related PCT Application No. PCT/GB2014/052488 dated Jan. 23, 2015.
Written Opinion in related PCT Application No. PCT/GB2014/052488 dated Jan. 23, 2015.
International Search Report in related PCT Application No. PCT/GB2014/052491 dated Oct. 30, 2014.
Written Opinion in related PCT Application No. PCT/GB2014/052491 dated Oct. 30, 2014.
International Search Report in related PCT Application No. PCT/GB2014/052492 dated Oct. 31, 2014.
Written Opinion in related PCT Application No. PCT/GB2014/052492 dated Oct. 31, 2014.
International Search Report in related PCT Application No. PCT/GB2014/052490 dated Aug. 13, 2014.
Written Opinion in related PCT Application No. PCT/GB2014/052490 dated Aug. 13, 2014.
International Search Report in related PCT Application No. PCT/GB2014/052487 dated Feb. 2, 2015.
Written Opinion in related PCT Application No. PCT/GB2014/052487 dated Feb. 2, 2015.
"3rd Generation Partnership Project; Technical Specification Group Services and System Aspects; IP Multimedia Subsystem (IMS) centralized services (Release 8)", 3GPP Standard; 3GPP TR 23.892, 3rd Generation Partnership Project (3GPP), Mobile Competence Centre ; 650, Route Des Lucioles ; F-06921 Sophia-Antipolis Cedex; France, No. V8.0.1, Mar. 1, 2008 (Mar. 1, 2008), pp. 1-167, XP050364164, paragraph [03.1] paragraphs [6.2.1]-[6.2.2.2.2]; figures 6.2.1-1 paragraphs [06.7]-[6.7.1a.1.2]; figures 6.7.1-1.
Moyer D Marples S Tsang J Katz P Gurung T Cheng A Dutta Telcordia Technologies H Schulzrinne Columbia University Arjun Roychowdhur: "Framework Draft for Networked Appliances using the Session Initiation Protocol; draft-moyer-sip-appliances-framework-02.txt", Jun. 1, 2001, No. 2, Jun. 1, 2001 (Jun. 1, 2001), XP015032766, ISSN: 0000-0004 paragraph [004.]; figure 4.
Simon Tsang Stan Moyer Dave Marples Telcordia Technologies et al: "SIP Extensions for Corrimunicaiirly with Networked Appliances; dtait-tsang-sip-appliances-do-00.txt", Nov. 1, 2000, 1 Novel-T-113e( 2000 (Nov. 1, 2000), XP015036219, ISSN: 0000-0004 paragraphs [004.]-[5.2]; figure 2.
Berger S et al: "Ubiquitous computing using SIP", NOSSDAV'03; [Proceedings of the International Workshop on Network and Operating System Support for Digital Audio and Video (NOSSDAV)],Monterey, California, USA, Jun. 1, 2003 (Jun. 1, 2003), pp. 82-89, XP002340516, DOI: 10.1145/776322.776336 ISBN: 978-1-58113-694-4 paragraph [3.5.2.].
Third Party Submission filed Sep. 21, 2016, in U.S. Appl. No. 15/028,382.

(56) References Cited

OTHER PUBLICATIONS

International Search Report in related PCT Application No. PCT/GB2014/053026 dated Mar. 19, 2015.
Written Opinion in related PCT Application No. PCT/GB2014/053026 dated Mar. 19, 2015.
Rodolfo Cartas et al: "An IMS Based Mobile Podcasting Architecture Supporting Multicast/Broadcast Delivery," Principles, Systems and Applications of IP Telecommunications. Services and Security for Next Generation Networks; [Lecture Notes in Computer Science], Springer Berlin Heidelberg, Berlin, Heidelberg, vol. 5310, Jul. 1, 2008 (Jul. 1, 2008), pp. 21-44, XP019109762, ISBN: 978-3-540-89053-9 paragraphs [005.]-[5.2.]; figures 8,10.
United States Patent and Trademark Office, Non-Final Office Action issued in U.S. Appl. No. 15/028,395, Notification dated Sep. 6, 2019, 6 pgs.

\* cited by examiner

|  | Virtual Users | |
|---|---|---|
|  | Few consumers | Many consumers |
| Few producers | • Home alarm<br>• Only you and police know it's gone off | • Public single-value sensor<br>• Web cam |
| Many producers | • Aggregator node to service technician | • Met office weather stations |

Virtual Devices (y-axis)

FIG. 7

|  | Virtual Users | |
|---|---|---|
|  | Few producers | Many producers |
| Few consumers | • Light switch<br>• Security system | • Voting |
| Many consumers | • Power station<br>• Traffic lights | • Public street-lamp switching |

Virtual Devices (row axis labels: Few consumers / Many consumers)

FIG. 8

METHODS AND APPARATUSES FOR PROVIDING A DATA FEED FOR INTERNET OF THINGS

CROSS-REFERENCE TO RELATED APPLICATIONS

International Application No. PCT/GB2014/053026 entitled "METHODS AND APPARATUSES FOR PROVIDING A DATA FEED FOR INTERNET OF THINGS," filed Jul. 10, 2014, which claims priority to U.S. Provisional Application Ser. No. 61/888,472 entitled "INTERNET OF THINGS," and filed Oct. 8, 2013, the contents of each of the aforementioned applications being incorporated by reference as if fully set forth herein.

TECHNICAL FIELD

The present invention discloses network arrangements, virtual devices, communication and control systems, authentication systems and methods for authenticating devices and data, suitable for use with the Internet and particularly the Internet of Things. There are also disclosed methods of operating the aforementioned arrangements, devices and systems.

BACKGROUND

The Internet of Things refers to uniquely identifiable objects and their virtual representations in an internet-like structure. If all objects and people in daily life were equipped with identifiers, they could be managed and inventoried by computers. Much speculation has focused on the tagging of things using for example radio frequency identification (RFID) and technologies such as near field communication, barcodes, quick-response (QR) codes and digital watermarking.

Equipping all objects in the world with minuscule identifying devices or machine-readable identifiers could be transform daily life. For instance, business may no longer run out of stock or generate waste products, as involved parties would know which products are required and consumed. Users could interact with devices remotely based on present or future needs.

However this bold vision is faced with a plethora of practical challenges. For example, it is not clear how, in practice the architecture would look and be operated so as to be safely controlled. It is not clear how devices producing data feeds and requestors consuming data feeds would be connected in a trusted manner. For example, requestors would have little or no information on the true identity or integrity of remote devices or the quality of the data they produce. Likewise conventional web based architectures and protocols would be vulnerable to security breaches and attacks, for example attacks in which requestors or devices pretend to be something they are not, and, denial of service attacks.

SUMMARY

According to an aspect of the present invention, there is provided a computer apparatus configured to broker communications between a plurality of virtual devices, each virtual device being a proxy for one of a real device or a real requestor, the computer apparatus comprising a registrar computer configured to communicate with said virtual devices and maintain a register of said virtual devices, wherein the register comprises a unique identifier for each virtual device associated with meta data defining one or more of (i) data available through the virtual device and (ii) a resource controllable through the device.

According to another aspect of the present invention, there is provided a computer apparatus configured to broker communications between a plurality of virtual devices, each virtual device being a proxy for one of a real device or a real requestor, the computer apparatus comprising: a registrar computer configured to communicate with said plurality of virtual devices and maintain a register of said virtual devices; and a data feed directory comprising entries indicating data and/or resources available to requestor virtual devices from at least one virtual device registered with the registrar computer.

The above computer apparatus, wherein requestor virtual devices can request one or more data feeds from the data feed directory and responsive to said request the registrar computer will facilitate or not facilitate the data feed request based on authorisations or permissions defined by the source device.

The above computer apparatus, further comprising an application interface usable by requestors to synthesise a new data feed from one or more data feeds available in the data feed directory by one or more of (i) modifying and available data feed and (ii) combining two or more of said available data feeds.

The above computer apparatus wherein the register of virtual devices maintained by the registrar computer further comprises a local device network ID for the real device corresponding to each virtual device.

A computer apparatus as described above wherein the registrar computer comprises a registration API configured to receive device a registration request from a virtual device, the request comprising one or more of a callback URL, a local unique identifier of a device in its device network, and meta data relating to the device.

Preferably, the device meta data is selected from one or more of: device location, type, a description of one or more sensors associated with the device, a description of one or more actuators associated with the device, and a description of one or more services for service levels associated with the device.

A method of registering a virtual device with a registrar computer, the method comprising receiving from a virtual device a registration request message comprising one or more of: a callback URL configured for receiving communications from remote virtual devices; a unique identifier of a real device corresponding to the registering virtual device, and meta data defining one or more of (i) data available from the virtual device and (ii) a resource available on virtual device.

A method as above, wherein the registrar computer generates a globally unique identifier corresponding to the registering virtual device and stores it in association with meta data defining the virtual device.

A method of brokering a request for data between a virtual requestor device and a virtual device configured to provide data, the method comprising:

receiving at a registrar computer a device data request message from a requestor virtual device, the device data request message comprising a callback URL of the requestor virtual device;

passing from the registrar computer a further request to the virtual device configured to provide said data, said further request comprising the callback URL of the requestor device;

wherein responsive to said further request the virtual device configured to provide data provides the requested data to the callback URL of the requestor virtual device.

A method as above, wherein the device data request message comprises authentication information.

A method as above wherein responsive to said further request a machine API the virtual device configured to provide data provides the requested data to the callback URL of the requestor virtual device without routing said data via said registrar computer.

A method as above wherein responsive to said further request the virtual device configured to provide data provides the requested data directly to the callback URL of the requestor virtual device.

A method as above wherein responsive to said further request the virtual device configured to provide data provides the requested data to the callback URL of the requestor virtual device over a secure pathway.

A method of brokering a request for data between a virtual requestor device and a virtual device configured to provide data, the method comprising:

receiving at a registrar computer a device data request message from a requestor virtual device, the device data request message comprising a data destination associated of the requestor virtual device;

passing from the registrar computer a further request to the virtual device configured to provide said data, said further request comprising the data destination of the requestor device; and wherein, subject to the requestor virtual device being authorised according to authorisations or permissions of the virtual device configured to provide data, the virtual device configured to provide data providing the requested data to the data destination of the requestor virtual device.

A method of remotely actuating a device by means of brokered communications between a requestor virtual device and a virtual device configured to actuate, the method comprising:

passing from a virtual device configured to actuate to a registrar computer an actuation invitation comprising a callback URL;

passing from said registrar computer to a requesting virtual device a further actuation invitation message comprising the callback URL;

said passing causing said requestor virtual device to call an actuation by communicating with said callback URL of the virtual device configured to actuate.

A method as above, wherein said callback URL is a one-time URL.

A method as above, wherein said callback URL is replaced in each relevant invitation by an actuation command destination of the device configured to be actuated, wherein the actuation command destination may be a callback URL but may be a suitable alternative.

A method as above, wherein one or more of said actuation invitation messages comprises authentication information.

A method according to any of the above methods referring to authentication information, wherein the authentication information comprises an authentication token. Preferably, said authentication for the actuation is controlled according to the authorisations or permissions of device configured for actuation.

The above methods of remotely actuating a device comprising, before generation of either of said actuation invitation, there is a step of receiving at a registrar computer a request for actuation from a requestor virtual device.

A method as above further comprising passing from the registrar computer and actuation request message to a virtual device configured to actuate.

Any of the methods mentioned above, wherein a callback URL is replaced by an alternative data destination associated with the relevant virtual device.

A method of requesting historical device data from a virtual device configured to produce data by means of communication brokered by a registrar computer, the method comprising:

receiving at a registrar computer a historical data request comprising a data destination of a requesting virtual device, passing a further historical data request from said registrar computer to a virtual device configured to produce said historical data, wherein said further historical data request comprises said data destination of the requesting virtual device and causes the virtual device configured to produce said data to supply the requested historical data to the data destination of said virtual requestor device.

A method as above wherein said data destination of the virtual requestor device comprises a callback URL of the virtual requestor device.

A method as above wherein said data supply is provided by means of a call back from the virtual device configured to produce said data to the callback URL of the virtual requestor device.

Any method of requesting historical data as above, wherein said historical data request or said further historical data request comprises a time period of interest.

Any method of requesting historical data as above, wherein said historical data request or said further historical data request comprises authentication information. Preferably, said authentication information comprises one or more authentication tokens.

A method as above, wherein said callback from said virtual device configured to produce data to said call back URL of the virtual requestor device supplying said historical data comprises authentication information, preferably in the form of one or more authentication tokens.

According to other aspects of the invention, there are provided computer apparatus, network arrangements virtual devices, communication and control systems, authentication systems, devices and data, configured to perform any and all of the above-mentioned methods.

In this description the terms "virtual requestor" and "requestor virtual device" may be used interchangeably.

FIGURES

Exemplary embodiments of the present invention are described herein below with reference to the accompanying drawings in which.

FIG. 7 indicates exemplary sensor use cases according to an embodiment of the present invention; and FIG. 8 indicates exemplary actuator use cases according to an embodiment of the present invention.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Brokered Communication between Virtual Devices

Figure 1:
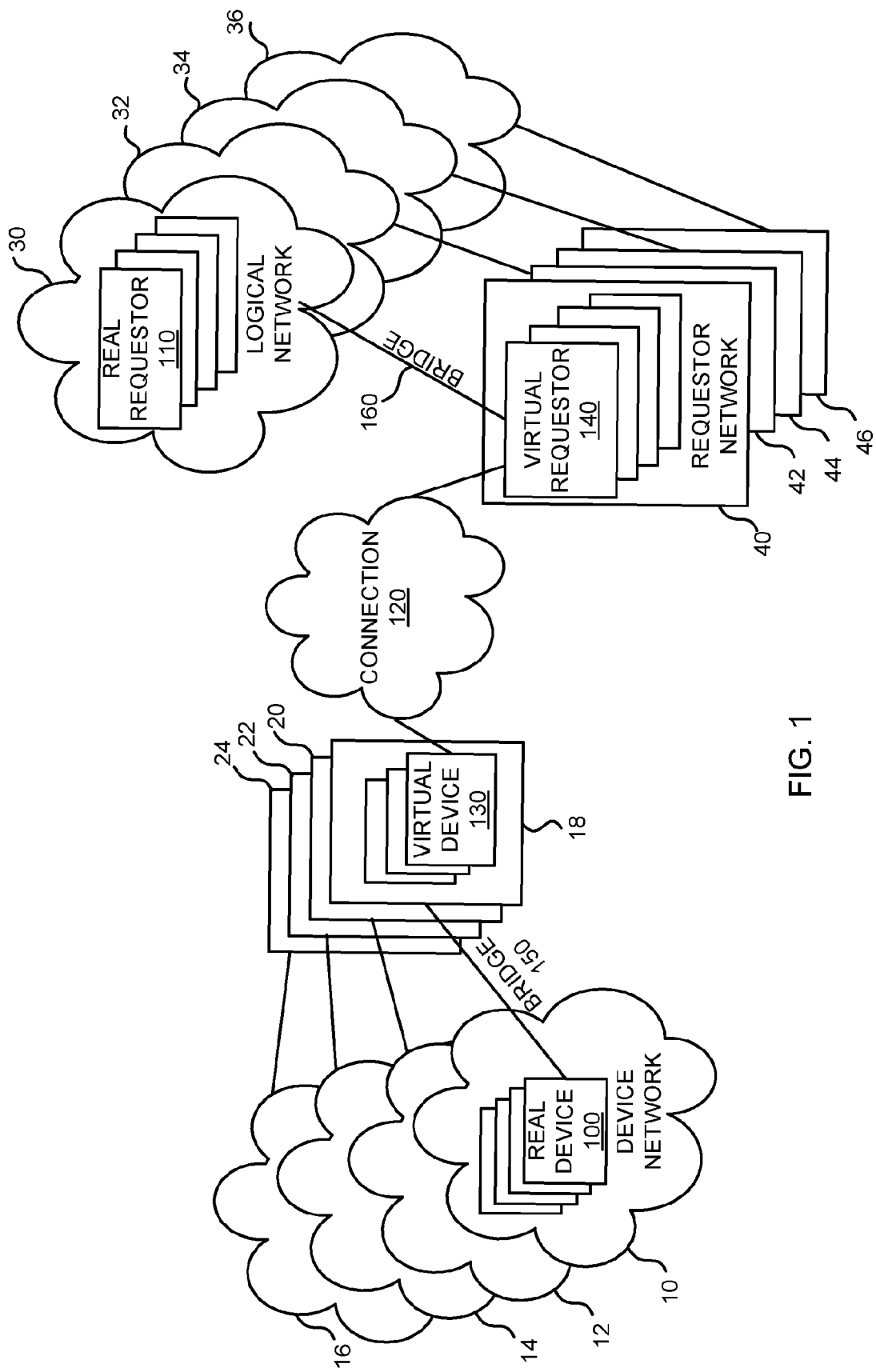
FIG. 1 is a schematic of a network according to an embodiment of the present invention.

FIG. 1 is a schematic diagram of an embodiment of present invention in which a plurality of device networks 10, 12, 14 and 16 each contain a population of real devices producing data and, optionally, consuming data or receiving control parameters. The real devices 100 are able to communicate with one or more real requestors 110 via a brokered connection 120. The requestors are typically geographically remote, but not necessarily. They may be located across a plurality of different logical networks 30,32,34,36.

Each real device 100 has a counterpart virtual device 130 to which it is coupled by a bridge network 150. The virtual device 130 is a proxy representing the real device 100 running on for example a virtual device server, of which there may be many 18,20,22,24. In one embodiment, the virtual device servers are web servers.

A real device 100 can be any physical device capable of generating and uploading data. The data uploaded from physical devices is used to generate data feeds for consumption by real requestors 110. A real requestor 110 can be any entity capable of requesting data from the population(s) of real devices, for example a human user or a machine user.

Each requesting entity 110 has a counterpart requestor virtual device 140 to which it is connected via a bridge network 160. A requestor virtual device 140 is a proxy representing a real requestor entity 110 and running on a virtual device server, which may be for example a web server. There may be many such virtual device servers 40,42,44,46. The bridge network 160 connecting real requestors 110 and requestor virtual devices 14D may be any private or public network, or a combination of both.

Brokered connections may be established between a virtual device 130 and a requester virtual device 140 in both directions. The bridge network 150 connecting real 100 and virtual devices 130 may be a public network or a private network, or a combination of both. For example the bridge 150 may be established through a portion of the Internet or the Internet of Things.

The connection 120 between virtual device 130 and the requester virtual device 140 may use any suitable connection capable of supporting machine to machine communication in this case between a virtual device 130 and a requestor virtual device 140. This connection may be established through a public network or private network or a combination of both public and private networks. For example the connection 120 may be established through a portion of the Internet or the Internet of Things.

Machine to machine communications between virtual devices 130 and requestor virtual devices 140 are brokered by a trusted registrar computer capable of managing communications between virtual devices according to API and permissions data relating to the real devices. In this way, the devices and their data feeds can be authenticated and data feeds can be consumed without exposure to attacks, such as a denial of service attack. As will be explained hereinafter, it is also possible to authenticate data feeds combining data from multiple devices and new data feeds that have been created or modified by requesters. All such data feeds can be monitored, stored, and, if desired, published along with indications providing a measure of integrity of the data feed.

In this context, "authentication" means confirming the identity of an entity and or a truth relating to an attribute of the entity (and may mean both in the case of device authentication). Authentication may also be used herein to mean confirming the integrity of a datum or data feed (in the case of data authentication). As such the act of authentication might involve for example confirming the identity of a person, entity, device or software program, or tracing the origins of a person, entity, device, software program or a data feed. Authentication often involves verifying the validity of at least one form of identification.

Virtual devices, including requestor virtual devices, described herein are proxy devices generated by software running on a computer. A virtual device may have data from, or data input by, its counterpart real entity. For example a virtual device may run on a web server and may be implemented in any suitable computing language. In one embodiment virtual devices are run in their own thread on a web server. Alternatively, the may run as re-entrant code and may have any number of instances as may be necessary.

Each virtual device generates a data feed which, for the purposes of this description may be regarded as comprising some form of output data payload and or some form of input parameters. Indeed when viewed like this, virtual devices (including requestor virtual devices) are all really proxy constructs configured to present a data feed according to an access criteria settable by the virtual device. A virtual device data feed may present for example data for output, a request for output data, data for input, a request for input data, or a combination of the aforementioned.

Preferably, the virtual devices are implemented in Java, PHP or LUA. In practice, real physical devices and machines present device interfaces and real users present user interfaces, and all these entities can be regarded as presenting interfaces or types of virtual entities according to various embodiments of the present invention.

Virtual Device

Figure 2A:
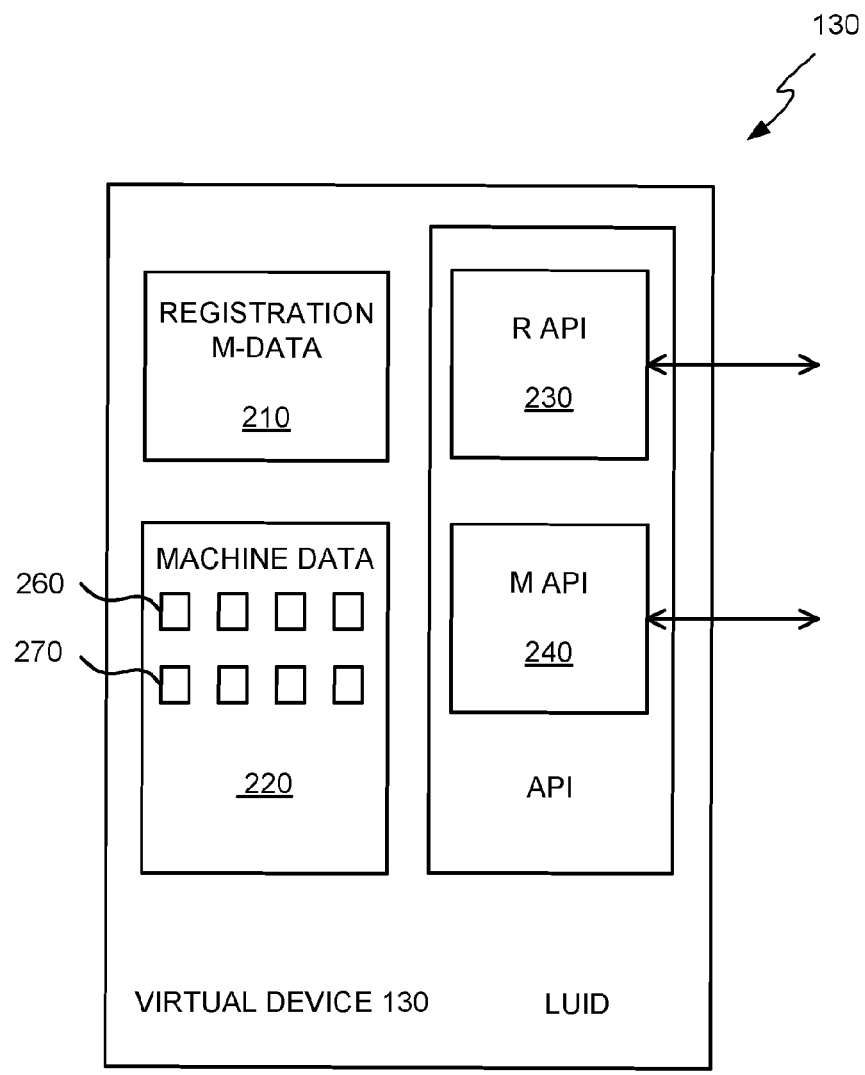
FIG. 2A is a schematic diagram of a virtual device according to the embodiment of FIG. 1.

FIG. 2A illustrates a virtual device 130 connectable to receive data from, and provide setting parameters to, the physical device 100. The virtual device 130 includes meta data and machine data. The meta data includes registration meta data 210 and the machine data 220 includes for example data payload 260 and settable parameters 270. In this case the machine data 220 comprises sensor-actuator data like the data payload 260 from the physical device 100 and settable control parameters 270 of the physical device 100.

This proxy device 130 runs on a web server or other computer. Registration meta data 210 may include for example a physical device identifier and descriptors indicating the nature of the device and a definitions of the API formats the device presents. A virtual device presents an API which is in this example, split into logical API blocks according to its registration meta data and machine data. It should be noted that in the following embodiments of the present invention, APIs, REST APIs and callback APIs consists of URLs. Thus, these terms can be described in terms of URLs.

Hence the virtual device 130 is configured to present registration API 230 and a machine API 240. The registration API presents registration meta data and the machine API presents machine data. According to this embodiment a virtual device is a proxy for its counterpart real device and is capable of running on a server or other computer in for example Java, LUA, PHP servlets, but also future programming languages which may be suitable for implementing embodiments of the invention. The virtual devices will run as instances on a server capable of presenting the APIs for for many real devices.

Figure 3:
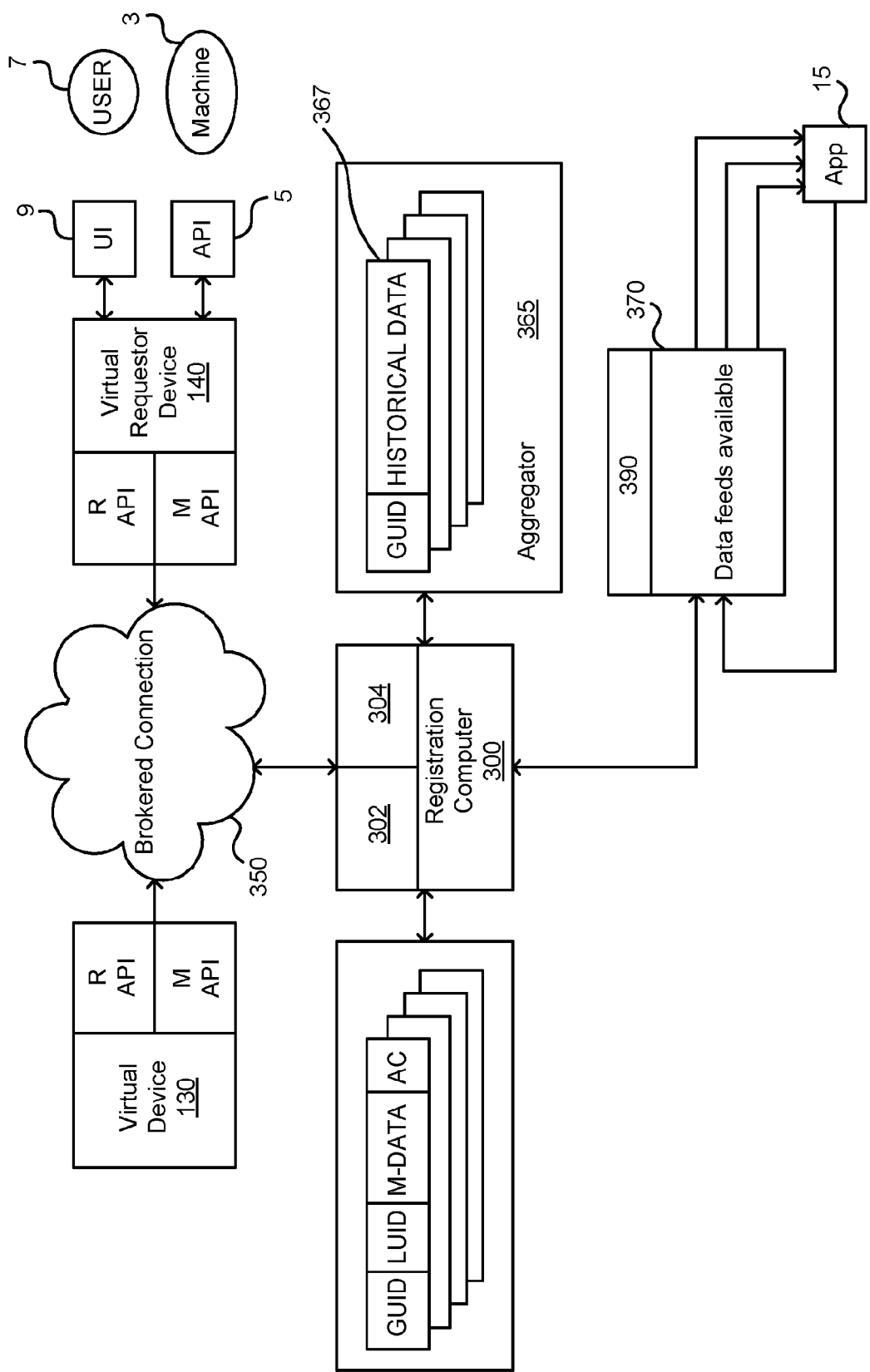
FIG. 3 is a schematic diagram of a registrar computer according to an embodiment of the present invention.

Each virtual device describes itself and its resources by means of semantic descriptors. This could be done for example using the Resource Description Framework (RDF) or a similar semantic descriptor language, or by XML. The virtual device 130 may present for example a RESTful API as its registration API for communications with the registrar computer. The virtual device 130 may also present a device-specific RESTful API as its machine API. In this example the APIs of the virtual device 130 are presented to a trusted registrar computer as will be described in more detail hereinafter. In this way the registration meta data of the virtual device 130 describes the nature and properties of the physical device as well as prescribing the nature and format of the machine API. Virtual devices 130 thus contain the meta data to indicate their own identity and security for actuations. So a virtual device can present an API defining the data and data formats it supplies, the things it can consume (e.g "turn lights on") and also things others can register for (e.g. "tell me when your light is on"). In this embodiment, a device network identifier LUID is part of the device URL. So there is one API for each virtual device enabling the device to act as broker of its own resources.
Registration of Devices FIG. 3 shows a registrar computer 300 according to an embodiment of the present invention. The registrar computer 300 is a trusted controlling authority. However, it may be located at a single location and may comprise one or more separate devices or machines. Alternatively, the registrar computer 300 may be distributed over a plurality of locations.

The registrar computer 300 is responsible for the issuance of global unique identifiers covering all virtual device populations. It is capable of arbitrating communications between a virtual device 130 and a requestor virtual device 140, thereby facilitating the transfer of data between the corresponding real requestor 110 and real device 100. The registrar computer 300 comprises a control directory which maintains data about virtual devices in association with a global unique identifier capable of uniquely identifying them within all of the virtual device populations.

The data maintained for each virtual device by the registrar computer includes for example: device network ID (LUID), global unique ID (GUID), physical device location, device type, sensor definitions, actuator definitions, and service definitions. This data may be presented in the form of RDF data.

Figure 4A:
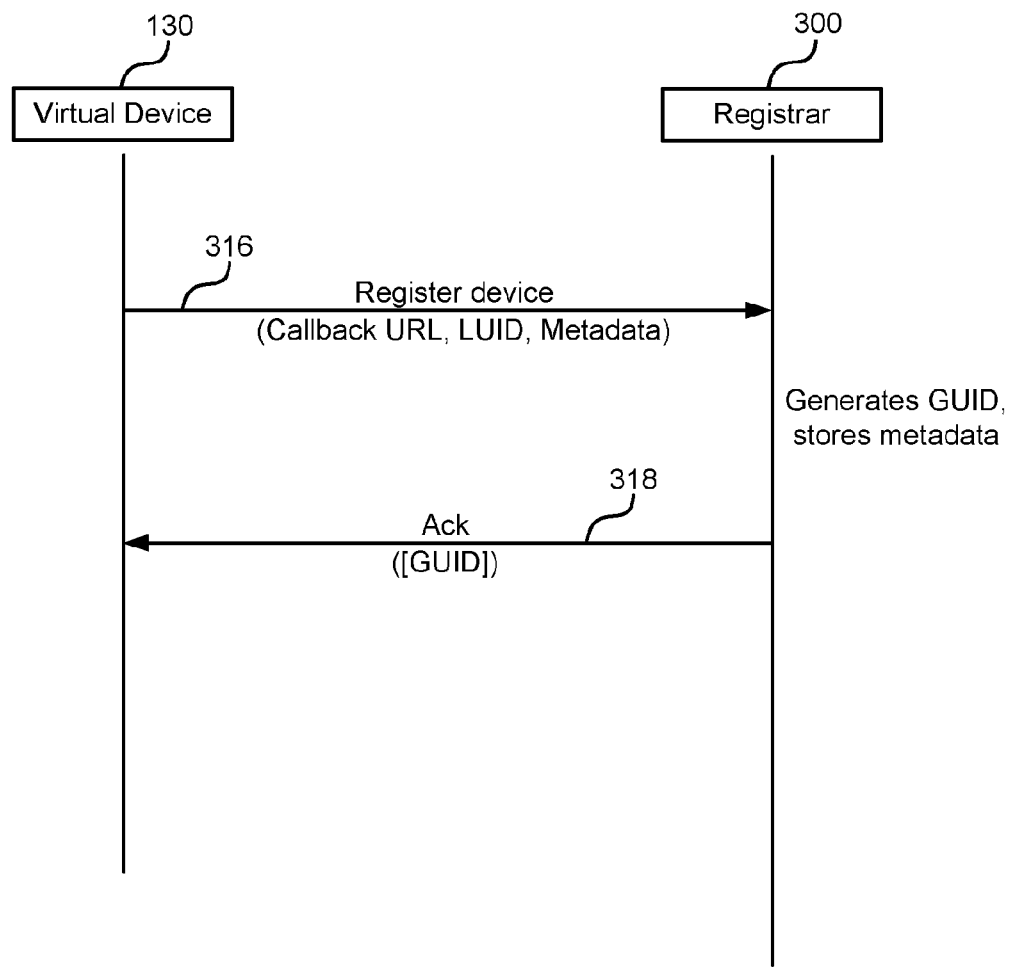
FIG. 4A is a device registration sequence according to an embodiment of the present invention.

FIG. 4A illustrates a device registration sequence. A real device 100 comes online and communicates with the virtual device 130 over the local bridge network to establish its counterpart virtual device. The real device 100 has a locally unique device network ID (LUID). Virtual devices may be established by any suitable method, for example by sending an identification packet to a known registration address in the local network and then possibly responding to a challenge from that server in order to prove its credentials. Then the LUID can be added to the database on the virtual device server thus establishing the device's API in the virtual device server. These communications on the bridge networks can be using any suitable protocol, for example with UDP or TCP, MQTT or even SMS.

At step 316 the virtual device calls the registration API 302 of the registration computer 300 and provides its callback URL, device network ID (LUID) and its meta data 210, 220. Optionally, the device may present certain permissions data to the registrar computer. This permissions data defines for example access criteria AC to be recorded in association with the relevant device record. Access Criteria AC may define for example, who can access the device data, on what conditions, whether the data feed can be generally published, and on what conditions. Alternatively, all or some of the access criteria data may be retained on the virtual device. At step 318 the registrar computer 300 acknowledges this registration event back to the registration API 230 of the virtual device 130. Optionally, the global unique identifier (GUID) is provided back to the virtual device.

In this way, a real device 100 is registered by its proxy virtual device 130 with the registrar computer 300. A real device may be a plug and play device which on first use automatically connects to its virtual device and onward to a preconfigured URL of the registrar computer via the network 350. The virtual device will present the real device's meta data, including registration data, to the registrar computer 300. The virtual device proxy will typically be one instance of many running on the virtual device server 18.

For example an HVAC system may present a post code and building identity, a manufacturers identifier indicating it is a heating ventilation and air conditioning system, the fact that it can sense hot water temperatures, monitor heating operations and ventilation actuation, and indicate formats and units for sensed data and control data.

Service definition data may include for example how often the physical device 100 reports (frequency), volume of data, availability as defined by permissions, historical period (if any), and or how accurate the raw data is.

The registrar computer 300 receives within the identifiers and meta data contextual information which assists with device authentication and access criteria data relating to the real device and its data. Certificated communications protocols may also be used to further enhance security.

As the registrar computer 300 knows the definition of the data feed available from the virtual device 130, and it also knows on what conditions the data feed for a particular device can be made available to others, it can publish the attributes of the virtual device's data feed in a feed directory 370 for consumption by authorised requestors. Requestors are authorised or not by the virtual devices according to the access criteria set in the corresponding real device. The feed directory 370 may be searchable via a search interface 390 as will be described in more detail hereinafter.

In order for a brokered connection to be established with a virtual device so that its data feed can be established, the corresponding requester entity must register with the registrar computer 300. There may be several types of requestor entities, including for example a human user 7 capable of using a user interface UI or a machine requestor 3 capable of using a machine interface (or API) 5 to generate a requestor virtual device 140.

Figure 2B:
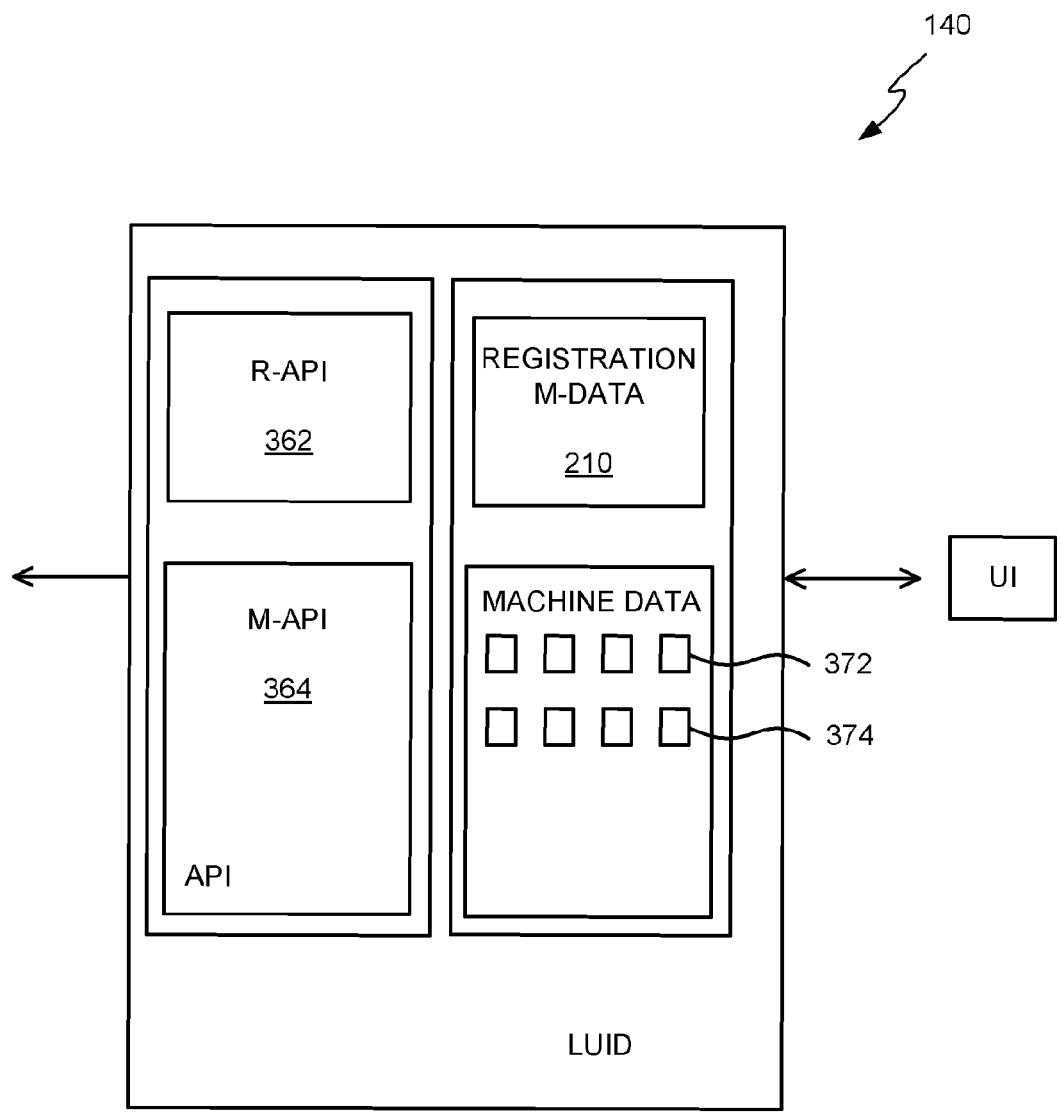
FIG. 2B is a schematic diagram of a requestor virtual device according to the embodiment of FIG. 1.

With reference to FIG. 2B, a real requestor entity will use a corresponding virtual device 140 to register its requirements with the registrar computer 300. The requestor virtual device 140 is a virtual device that has an API including a registration API 362 for presentation to the registrar computer API 302 and a machine data API 364 for indicating data requested 372 from the remote device and or providing settable parameters 374 of the remote device. The registration API 362 is used for communications with the registrar computer and in particular recording the local unique identifier LUID of the requestor virtual device in association a global unique identifier GUID and meta data 210 indicating the type and format of requested data and/or parameters to be supplied to the device.

The registrar computer 300 records the existence of the virtual requestor device and its requirements in broadly the same way as it records the capabilities and access criteria of the source virtual device 130. In this way, the requestor virtual devices 140 are capable of presenting requests for communications under the brokered control of the registrar computer 300 and according to the source device 130 access criteria.

Note that human users may include remote requestors and/or a network admin. The system or its users may also use applications 15 to synthesise desirable feeds from feeds available in the feed directory 370.

As described herein before in relation to virtual devices generally, a requestor virtual device may be defined in terms of RDF or similar. In this way a data feed originating from a physical device 100 is accessed by a requesting entity via a connection brokered by the registrar computer. Applications can be used to modify the data feeds and/or synthesize new data feeds based on combinations of existing feeds and/or operations on existing data feeds.

Registrar Computer'S Arbitration of Requests
Requesting a Data Feed

If the user knows of a source device it wants to receive data from and has identified a data feed in the data feed directory 370, it can request the data feed according to the following process.

The registrar's main function is to arbitrate between the source of a feed (the virtual device) and any prospective consumers of the feed (the virtual requestor devices). Its objective is to give control to the producing entities rather than the requesters to prevent the requestors from swamping the producers with requests in a denial of service type of attack. In this embodiment there is no direct communication from the requestor virtual device to the virtual device. There is direct communication, in the other direction, from the source virtual device to the requestor virtual device. In this example the process causes the requestor to open an API for the source virtual device to call with the data requested.

Figure 4B:
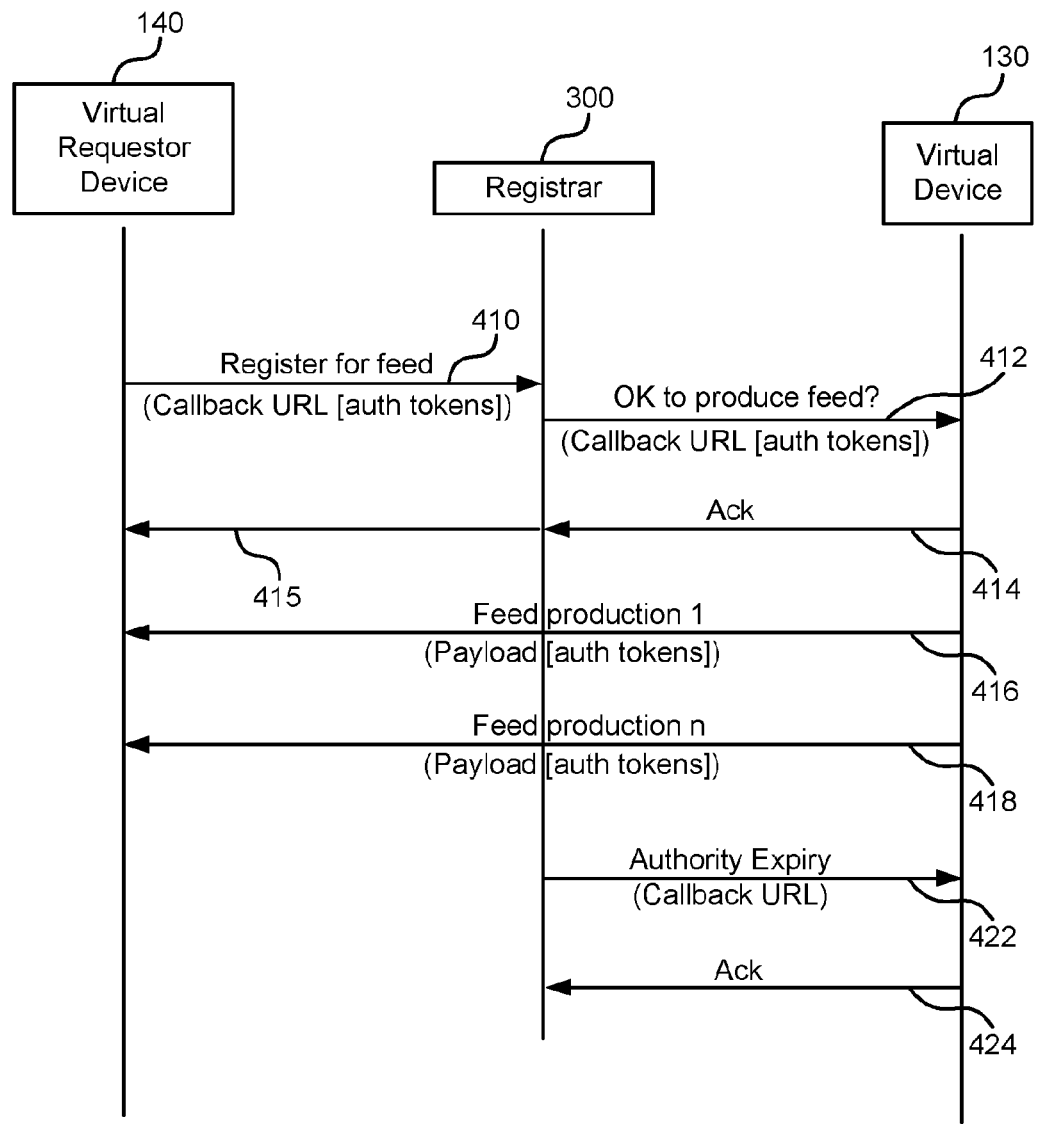
FIG. 4B is a feed request sequence according to an embodiment of the present invention.

An exemplary communication process for requesting a feed is explained with reference to FIG. 4B.

At step 410, the requestor virtual device 140 asks for authority from registrar for a data or a data feed and passes its callback URL for the relevant source virtual device to call. In this embodiment the requestor provides a callback RESTful URL. Optionally, the virtual requested device also includes authorisation information of some type, in this example tokens are included.

At step 412, the registrar computer 300 checks the access permissions for the requestor virtual device 140 with the source virtual device 130 and passes the callback URL of the requestor virtual device 140 to the source virtual device 130 so it knows where to call.

The source virtual device 130 adds the requested callback and relevant URL to a schedule of all the callbacks it needs to call and sends an acknowledgement 414 back to the registrar computer 300. The registrar may pass on acknowledgement 415 to the virtual requested device 140.

Figure 4C:
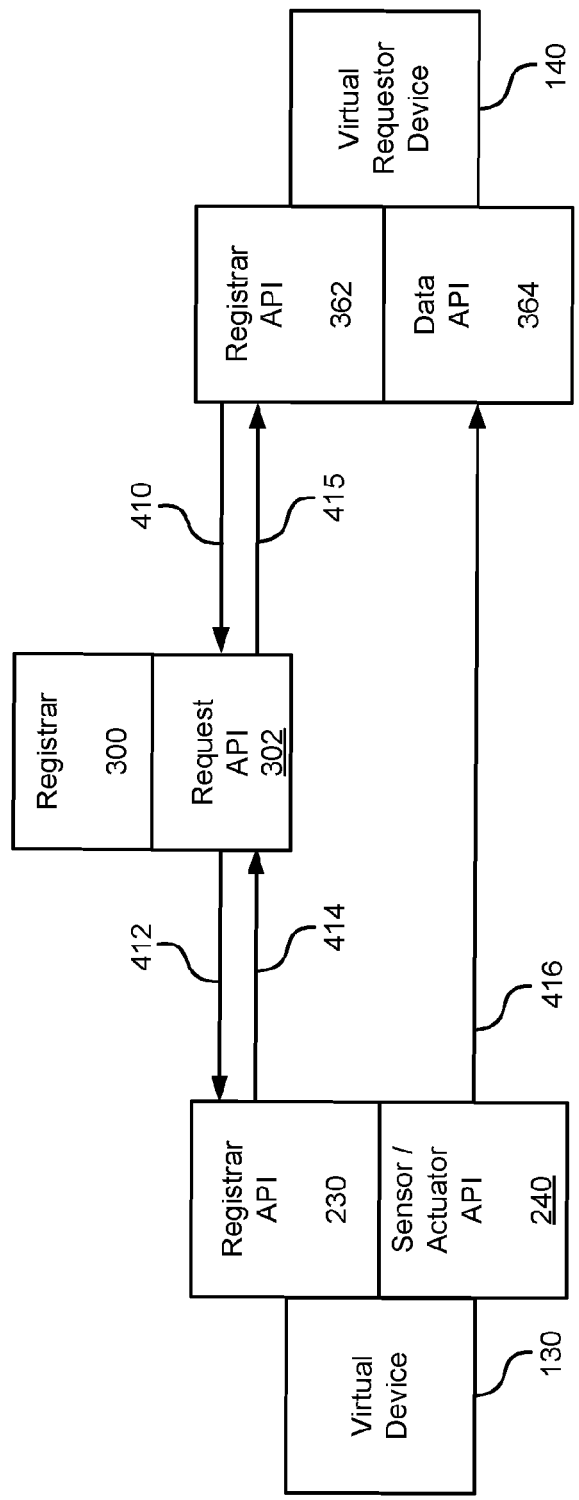
FIG. 4C is a schematic diagram illustrating the brokering of a connection between a virtual device and a requestor virtual device according to an embodiment of the present invention.

In step 416, the source virtual device 130 calls all the callbacks it has recorded in its schedule of callbacks. In this example this is achieved with HTTP POSTS. The source virtual device therefore POSTs the requested data to all authorised requestors who have requested it when the event occurs. This includes at least the step of the production of data payload (and optionally also authentication tokens) from the source device 130 to the callback URL provided by the virtual requestor device 140. Note with reference to FIG. 4C that it is apparent that in the case of both requests and authorisations (and if present acknowledgements) the communication is between a virtual device and registrar computer only; whereas the provision of data payload from the source virtual device 130 is directly to the virtual requestor 140. More specifically, the provision of data payload is from the machine API 240 of the source virtual device to the machine API of the virtual requestor 364 in response to the callback request.

As illustrated by step 418, there may be a number of successive data payload events in which data is provided from the virtual device to the virtual requestor according to the device specifications.

In this embodiment, the registrar computer informs the source virtual device of aged/invalid tokens so that it can stop calling the virtual requestor to provide it with data, as indicated by step 422.

Step 424 is an acknowledgement from the source virtual device 130 that it needs no longer callback the virtual requested device 140 with data.

The registrar computer 300 therefore verifies the identity and authority of the requesting virtual device by reference to the authentication data (local and global IDs) and access criteria associated with the source device. The registrar computer may also use additional contextual information to further authenticate the identity of the source virtual device and the data available from it.

Setting Parameters and Actuation of Remote Devices

For example the requesting entity may seek a hot water temperature feed from an HVAC system at 31 Waterloo Road; and it may seek to turn off the immersion heater in the event a threshold temperature is exceeded. Actuation with a one-time URL will now be explained with reference to FIGS. 5A and 5B.

This process deliberately cedes control to the source entities of the data payload in order to prevent the source entities from being swamping with requests in a denial of service type of attack. In this embodiment there is no direct communication from the virtual device to be actuated to the requestor virtual device that requests the actuation. There is direct communication, in the other direction, from the requestor virtual device to the virtual device to be actuated. In this example the virtual device to be actuated opens an API for the requestor to call with the data.

Figure 5A:
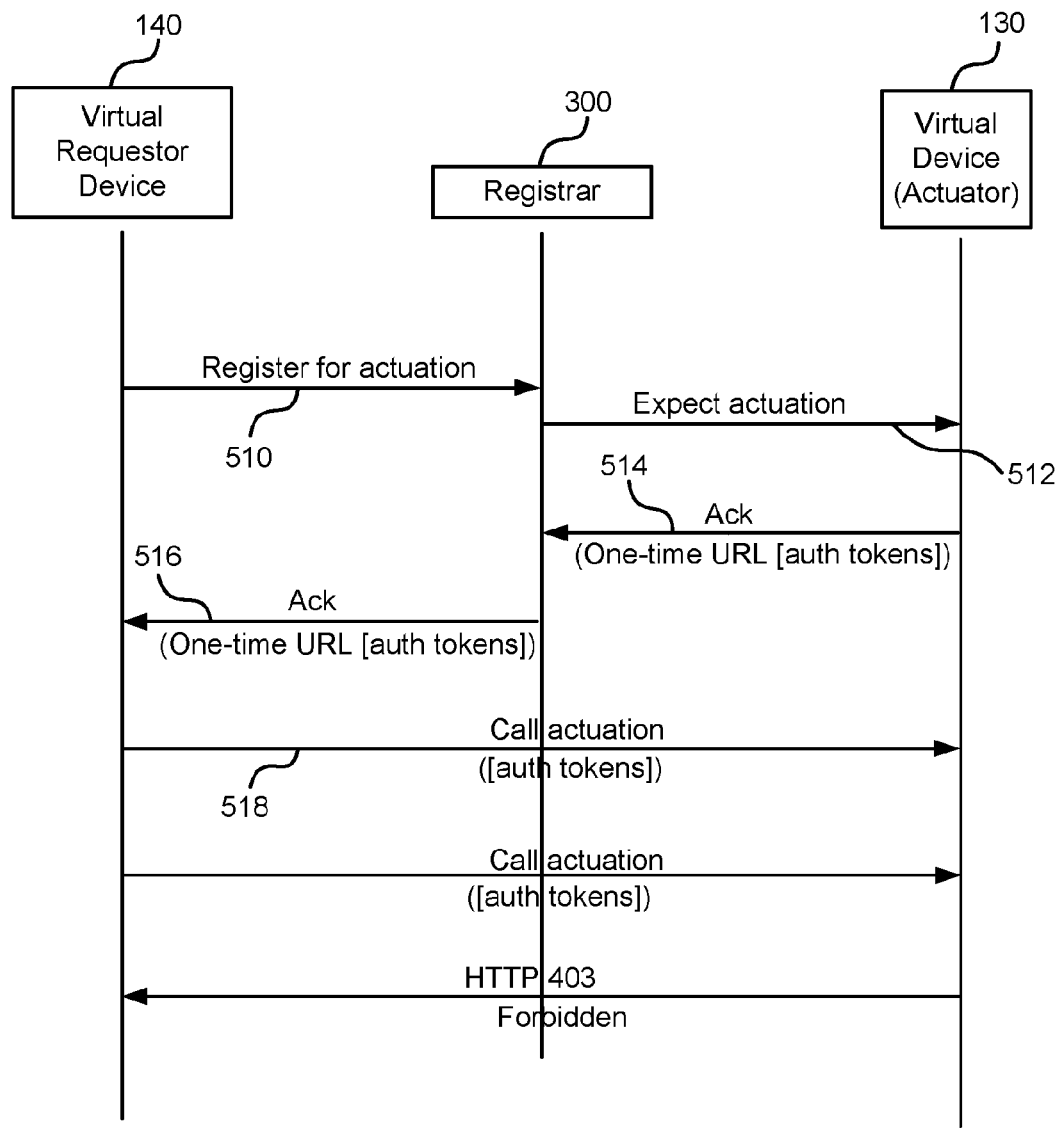
FIG. 5A is a sequence illustrating the communication process between a requestor virtual device and a virtual device for actuating a device according to an embodiment of the present invention.
Figure 5B:
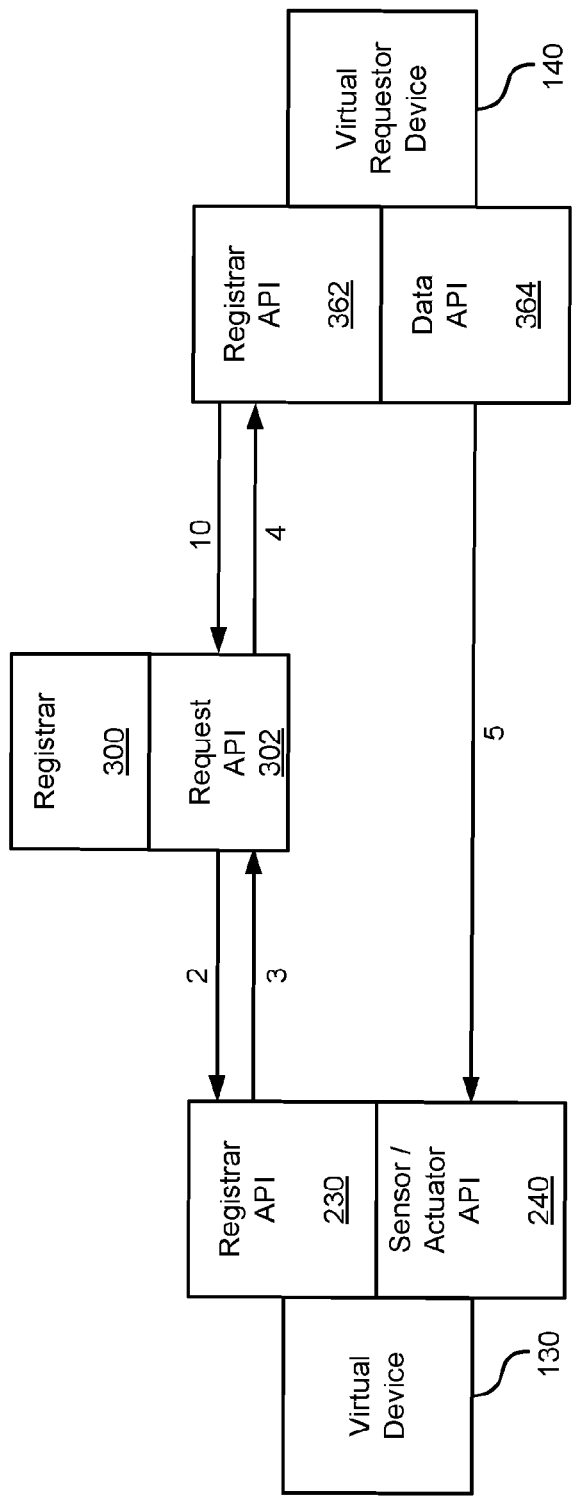
FIG. 5B is a schematic diagram illustrating the actuation of a device according to an embodiment of the present invention.

An exemplary communication process for actuating a device is explained with reference to FIG. 5A.

At step 510, the virtual requestor device 140 asks for authority from registrar computer 300 to supply the target virtual device with actuation data, for example a payload in the form of one or more settable parameters or one or more actuation conditions, or a combination of the aforementioned.

At step 512, the registrar computer 300 checks the authorisation for the requested actions with the virtual device 130 capable of being actuated and tells the virtual device to expect actuation.

At step 514, the virtual device 130 to be actuated acknowledges the request and supplies its callback URL to the registrar computer 300. This embodiment uses a one-time (obfuscated) URL, optionally along with authentication information, all of which is passed on by the registrar computer 300 to the virtual requestor 140 at step 516.

The virtual requestor 140 records the callback URL to a schedule of all the callbacks it needs to action. The virtual requestor calls the callbacks recorded in its schedule of callbacks. In this example this is achieved via HTTP POSTs of the settable parameters and/or actuation conditions to the callback URLs as shown in step 518. To the callback URL optionally further includes any other authorisation tokens or security mandated by the actuator.

In the future, the registrar computer may inform a virtual device of aged/invalid tokens so that it can stop issuing one-time URLs or calling the virtual devices with data. A virtual device which has the capacity to be an actuator (i.e. perform actions) will need to be certain that only authenticated and authorised requestors can call the callback URL to perform the action. To this end, virtual devices capable of being actuated will present a one-time URL for a requestor to call. This approach prevents replay attacks from unauthorised and/or unauthenticated requestors. Again, the registrar computer 300 will be the arbitrator with an objective of putting the virtual device in control over which requestors are allowed to call it and what security protocols they have to comply with in order to do it.

In the simple case, "Knowledge is authority", but other security mechanisms could be mandated as well such as OAuth, white-list, SSL, password, token, etc in the control of the actuating device. The actuating device mandates the security and can/will reject requestors if the security criteria are not satisfied. Given all virtual devices are registered with the registrar they may each be regarded as a known entity. There is not necessarily a need for the virtual devices to know that the virtual requestors have been authorised in any other way than if they present the correct authentication tokens in the process flow.

In one embodiment adapted for highly secure applications a pre-amble request for a challenge key (implemented in the same way as requesting data) could be mandated by the device and the requestor then has to present the correct answer to the challenge as well as the request for actuations. This may be required within a time limit.

Data Feeds with Historical Data

Consider a situation where a temperature node publishes temperature every 10 minutes. A user discovers this data feed and wishes to aggregate historical information from the feed. Assuming a 10 minute interval is acceptable going forwards, there is a challenge in how to get historical data from the system since requests for data result in the requestor being called back according to a virtual devices' callback schedule and thus only when the virtual devices allow.

With reference to back FIG. 3, a aggregator 365 records historical feed data 367 in association with the global unique identifier GUID for each feed. The registrar computer has access to this information and can arbitrate a suitable request which uses a one-time URL from the requestor to "back-fill" any history date range requested and thereafter continue with the scheduled feed POSTs.

Figure 5C:
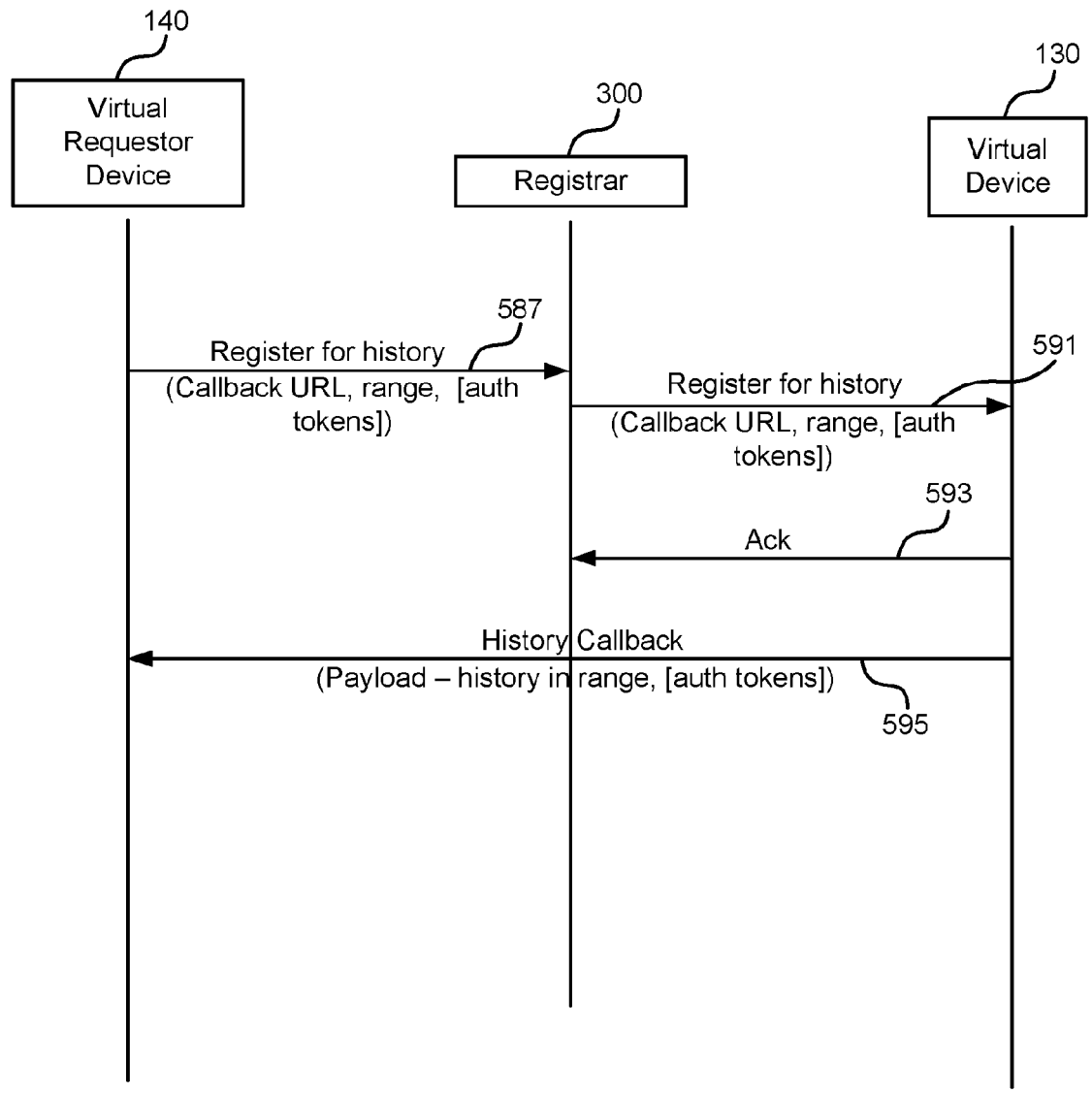
FIG. 5C is a sequence illustrating the communication process between a requestor virtual device and a virtual device for aggregating historical data from a data feed according to an embodiment of the present invention.

This process will now be described with reference to FIG. 5C.

At step 587, the requestor virtual device 140 registers for a one-time POST of historical data with the registrar computer 300. This involves sending the requestors callback URL, the time period of interest, and optionally authentication information.

At step 591, the registrar computer 300 calls the source virtual device 130 to establish if the request is authorised, passing the callback URL, specified time period, and any authentication information (if any). If the source virtual device 130 authorises the request it records the callback request in its schedule of callbacks and acknowledges back to the registrar computer 300 at step 593.

At step 595, the source virtual device HTTP POSTs the specified historical data to the callback URL of the requestor virtual device. This post optionally also includes and any authentication information which may be required by a security protocol. If current data is desired on a continuing basis a separate request a current data feed the play simultaneously. This could be done automatically by the registrar computer where an application is used to generate a new request including both current and historical date ranges.

In any above process implemented using REST, the API consists of URLs. i.e. you HTTP GET or POST a URL and the server fetches or performs some action dependent on the URL. In such cases is is possible to consider the URL as being like a "function" in a traditional API and the HTTP parameters being the arguments to the function. A callback (URL or function) is thus one provided by the caller to the called function with a view to receiving answers/acknowledgements in the future. In this way a type of secure asynchronous API work can be implemented.

Local Network

In the foregoing description, any data feed from the virtual device or actuation thereof passes to the real requestor via a proprietary protocol over TCP or UDP, or a machine-to-machine protocol such as MQTT, or even SMS.

Data Feed Types

FIG. 7 illustrates a number of exemplary types of data feed available according to an embodiment of the present invention. As described herein before, human or machine users can use a search interface to search the feed directory for published data feeds available from existing registered devices. Where the request cannot be serviced from the existing data feed directory, users can use applications to synthesise new data based on processing of one or more existing feed, the combination of two or more existing feeds, or a combination of the aforementioned.

Figure 6:
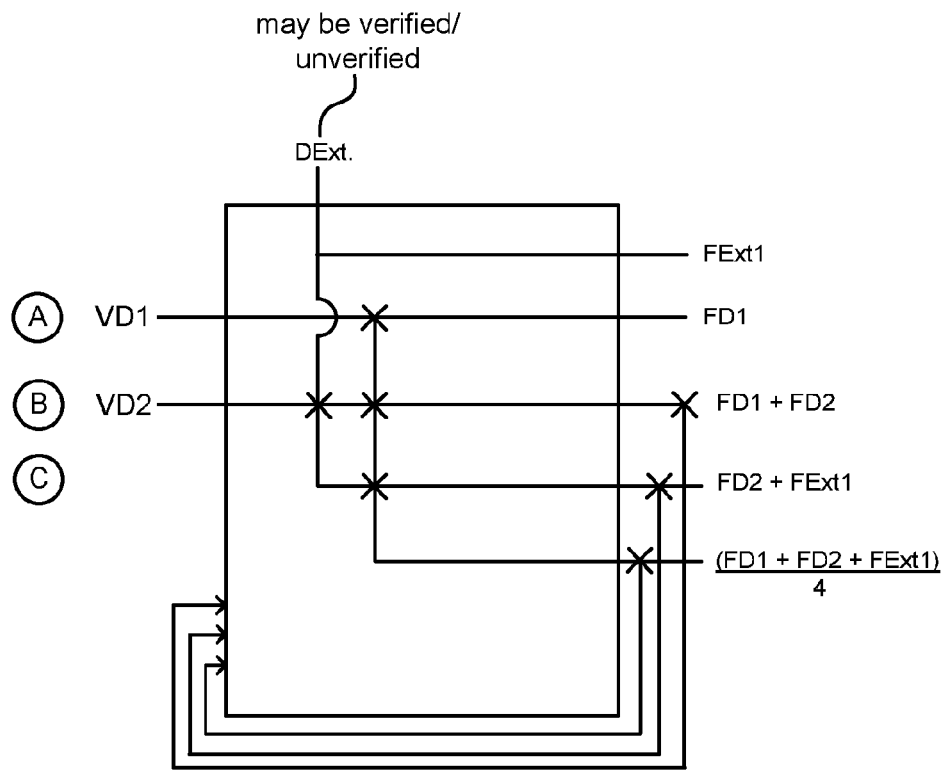
FIG. 6 is a schematic diagram illustrating the exemplary types of data feed available according to an embodiment of the present invention.

A number of different types of data feed are therefore available as illustrated in FIG. 6.

A first type of data feed is the authenticated data feed "FD1" and from virtual device VD1. This single data feed comprises only the data from the physical device D1. The identity of this physical device is known to the registrar computer and, preferably, some or all its attributes are also known to central computer 300. Therefore FD1 is an authenticated data feed.

A second type of data feed is the external data feed FExt1 generated from the external device DExt1 located externally of the network supervised by registrar computer 300. In this context, "external" means that the registrar computer does not hold information suitable for the authentication of the external device. This single data feed comprises only data from the external device Ext1 but since the external device Ext1 is not known to the registrar computer 300, this data feed is non-authenticated. Integrity of external feeds can be assessed in meaningful ways by for example user endorsements, ratings, popularity, repeat subscriptions or similar mechanisms.

A third type of data feed is the data feed "FD1+FD2". This data feed has been synthesised by combining the data feeds of virtual device VD1 and virtual device VD2 according to some predetermined operation. The identities of the physical devices corresponding to each of the virtual devices VD1 and VD2 are known and verifiable and, preferably some their device attributes are also known to the registrar computer 300. The registrar computer also knows and records the nature of the operation binding the data feeds in order to keep track of integrity and ancestry. As a result, this synthesised data feed is an authenticated data feed.

A fourth type of data feed is the data feed "FD2+FExt1". This data feed has been synthesised by combining the data feeds of virtual device VD2 and external device DExt1. Although the identity of the physical device D2 corresponding to the virtual device VD2 is known to the registrar computer 300, the identity of the external device DExt1 is not and therefore the synthesised data feed FD2+FExt1 is non-authenticated. The registrar computer knows this because it records ancestry of the synthesised data feeds in the authentication data table. Given this feed comprises both authenticated and non-authenticated feeds, it is referred to as a hybrid feed; and the hybrid feed itself is non-authenticated.

As illustrated by the fifth data feed "(FD1+FD2+FExt1)/4" any a number of available feeds can be combined and they may be combined using one or more mathematical functions to achieve a desired result feed. In such cases, the registrar computer records both the ancestry by means of links to contributory feeds and also data on the or each operation performed to combine the feeds. As a general rule, any feed comprising at least one non-authenticated contributory feed or at least one non-authenticated operation is a non-authenticated feed.

It is possible also to have a multi-feed comprising a plurality of unmodified authenticated feeds supplied together. In such cases the multi-feed is authenticated based merely on identity of the constituent feeds and without the need for the registrar computer to record any information about operation (because no operation has been applied in generating the multi-feed).

Any virtual device or application causing the existence of a data feed can determine whether or not it should be published in the directory, and any access conditions which may apply when third parties wish to access the feed.

In this embodiment the registrar computer keeps a record of the provenance of each device feed and also each synthesised feed. The RDF meta data from the device registration API achieved this for a virtual device 130,140. For synthesised feeds, there is provided a link to the parents RDF, and optionally also a record of any operations applied beyond mere aggregation of the constituent data feeds.

In this embodiment, the feed directory is semantically searchable. Searching tools may take into account data feed authentication (optionally including provenance of constituent feeds where relevant) and or data feed integrity scores applying to external feeds. Where particular data feeds are provided from external sources which are not able to be authenticated by the registrar computer, integrity indicators for these data feeds may be approximately estimated based on indications of reliability from outside the registrar computer's domain. For example, feeds supplied from external sources may be accompanied by one or more of popularity scores, user perceived trust or accuracy levels and or endorsements. Certificates or other known remote authentication methods may be used to authenticate remote sources insofar as that is possible.

Searching and/or searchable results may take into account service definitions as defined herein before. In addition, or in the alternative, searching and/or searchable results may take account of data feed price, which, may in turn, be a factor of integrity, urgency, and/or volume of the data requested. Note that the registrar computer knows which physical devices and virtual devices feeds have high integrity based upon the quantity and quality of authentication information in the entry of the authentication table.

It is possible to configure high integrity networks between authenticated devices and or authenticated devices and requestors in order to create trusted communication frameworks. Such a framework is defined by highly authenticated physical devices and real requestors and may be also VPN communication channels along communication pathways. Likewise, it is possible to create communication frameworks which may include devices that are not authenticated and or network pathways which are less secure. The latter may be perfectly adequate and more cost-effective in some use scenarios.

In preferred embodiments of the feed directory integrity indicators are provided by the registrar computer 300 in association with data feeds available from the data feed directory such that authenticated feeds are indicated to have high integrity and non-authenticated feeds are indicated to have relatively lower integrity. It is possible hybrid feeds and non-authenticated feeds have meaningful integrity indicators based for example on user indications of popularity, user perceived trust or accuracy levels and or endorsements.

Exemplary Sensor Use Cases (FIG. 7)

An example of a sensor use cases with relatively few devices and relatively few requestors is a home security alarm. Note that only the proprietor of the property and security (police force) monitoring the alarm would know it had been actuated.

An example of a sensor use case with many requestors and relatively few devices would include single-value sensors such as web cams.

An example of a sensor use case with many devices but relatively few requestors would include an aggregator note to service a technician.

An example of a sensor use case with many devices and many requestors is a network of Met office weather stations with public access Exemplary Actuator Use Cases (FIG. 8)

An example of an actuator use case with relatively few devices and relatively few requestors is a home lighting system or a home security system.

An example of an actuator use case with a large number of devices but relatively few requestors is an electronic voting system.

An example of an actuator use case with a few devices but a large number of requestors is a traffic light system or for example a utility power distribution system.

An example of an actuator use case with relatively high numbers of devices and requestors are is a publically switchable street light network.

These examples are not intended to be limiting.

In practice, it will be apparent in view of the description herein that many such use cases can be simultaneously supported by embodiments of the present invention.

The registrar and virtual device servers of the present invention are exemplary computing-based devices which may be implemented as any form of a computing and/or electronic device, and on which the embodiments of the present invention may be implemented.

The registrar computer and virtual device servers comprise one or more processors which may be microprocessors, controllers or any other suitable type of processors for processing computer executable instructions to control the operation of the registrar and virtual device servers in order to function according to any one of the above described embodiments. In some instances, for example where a system on a chip architecture is used, the processors may include one or more fixed function blocks (also referred to as accelerators) which implement a part of the method of any one of the above embodiments in hardware (rather than software or firmware). Platform software comprising an operating system or any other suitable platform software may be provided at the computing-based device to enable application software to be executed on the device.

The computer executable instructions may be provided using any computer-readable media that is accessible by a computing based device. Computer-readable media may include, for example, computer storage media such as a memory and communications media. Such media includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. the memory) is described as within the computing-based device it will be appreciated that the storage may be distributed or located remotely and accessed via a network or other communication link (e.g. using a communication interface).

The computing-based device also comprises an input/output controller arranged to output display information to a display device which may be separate from or integral to the computing-based device. The display information may provide a graphical user interface. The input/output controller is also arranged to receive and process input from one or more devices, such as a user input device (e.g. a mouse or a keyboard). In an embodiment the display device may also act as the user input device if it is a touch sensitive display device. The input/output controller may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A computer apparatus configured to broker communications between a plurality of virtual devices, each virtual device being a proxy for one of a real device or a real requestor, and the plurality of virtual devices comprising at least one virtual device that is a proxy for a real device, the computer apparatus comprising:
   a registrar computer configured to communicate with said plurality of virtual devices and maintain a register of said virtual devices; and
   a data feed directory comprising entries indicating data feeds and/or resources available to virtual devices acting as proxies for real requesters from the at least one virtual device acting as a proxy for a real device that is registered with the registrar computer,
wherein the virtual devices acting as proxies for real requestors can request to receive one or more data feeds from the data feed directory and responsive to said request the registrar computer will facilitate or not facilitate the data feed request based on authorizations or permissions defined by the virtual device acting as a proxy for a real device providing the one or more data feeds.

2. The computer apparatus of claim 1, further comprising an application interface usable by virtual devices acting as a proxy for a real device to synthesize a new data feed from one or more data feeds available in the data feed directory by one or more of (i) modifying an available data feed and (ii) combining two or more of said available data feeds.

3. The computer apparatus of claim 1, wherein the register of virtual devices maintained by the registrar computer further comprises a local device network ID for the real device corresponding to each virtual device.

4. A computer apparatus configured to broker communications between a plurality of virtual devices, each virtual device being a proxy for one of a real device or a real requestor, and the plurality of virtual devices comprising at least one virtual device that is a proxy for a real device, the computer apparatus comprising:
- a registrar computer configured to communicate with said plurality of virtual devices and maintain a register of said virtual devices; and
- a data feed directory comprising entries indicating data feeds and/or resources available to virtual devices acting as proxies for real requesters from the at least one virtual device acting as a proxy for a real device that is registered with the registrar computer, wherein the registrar computer comprises a registration API configured to receive a registration request from a virtual device acting as a proxy for a real device, the request comprising one or more of a callback URL, a local unique identifier of a device in its device network, and meta data relating to the device.

5. The computer apparatus of claim 4, wherein the device meta data is selected from one or more of: device location, type, a description of one or more sensors associated with the device, a description of one or more actuators associated with the device, and a description of one or more services for service levels associated with the device.

6. The computer apparatus of claim 4, wherein the registrar computer is configured to communicate with said plurality of virtual devices and maintain the register of said virtual devices, wherein the register comprises a unique identifier for each virtual device in the register, the unique identifier being associated with meta data defining one or more of (i) data available to a virtual device that is a proxy for a real requestor through the virtual device that is a proxy for a real device and (ii) a resource controllable through the virtual device that is a proxy for a real device.

7. A method of brokering a request for data between a plurality of virtual devices, each virtual device being a proxy for one of a real device or a real requestor, and the plurality of virtual devices comprising at least one virtual device that is a proxy for a real device, the method comprising:
- receiving at a registrar computer a device data request message from a virtual device acting as a proxy for a real requestor, the device data request message comprising a callback URL of the virtual device acting as a proxy for a real requestor;
- passing from the registrar computer a further request to a one of the plurality of virtual devices configured to provide data, said further request comprising the callback URL of the virtual device acting as a proxy for a real requestor;
- wherein responsive to said further request the one of the plurality of virtual devices configured to provide data causes the requested data to be provided to the callback URL of the virtual device acting as a proxy for a real requestor, wherein responsive to said further request a machine API of the one of the plurality of virtual devices configured to provide data provides the requested data to the callback URL of the virtual device acting as a proxy for a real requestor without routing said data via said registrar computer.

8. The method of claim 7, wherein the device data request message comprises authentication information.

9. The method of claim 7, wherein responsive to said further request the one of the plurality of virtual devices configured to provide data provides the requested data directly to the callback URL of the virtual device acting as a proxy for a real requestor.

10. The method of claim 7, wherein responsive to said further request the one of the plurality of virtual devices configured to provide data provides the requested data to the callback URL of the virtual device acting as a proxy for a real requestor over a secure pathway.

* * * * *